United States Patent [19]

Schultz et al.

[11] 3,829,686

[45] Aug. 13, 1974

[54] PULSED NEUTRON LOGGING SYSTEM WITH GAIN COMPENSATION

[75] Inventors: Ward E. Schultz; Harry D. Smith, Jr.; Dan M. Arnold, all of Houston, Tex.

[73] Assignee: Texaco Inc., New York, N.Y.

[22] Filed: June 28, 1973

[21] Appl. No.: 374,449

Related U.S. Application Data

[63] Continuation-in-part of Ser. No. 181,910, Sept. 20, 1971, abandoned.

[52] U.S. Cl.............. 250/261, 250/256, 250/262, 250/270
[51] Int. Cl............................................. G01t 1/18
[58] Field of Search................... 328/175, 154, 150; 250/261–264, 270, 256

[56] References Cited
UNITED STATES PATENTS

2,888,568  5/1959  Jones et al............................ 250/263
3,270,205  8/1966  Ladd et al............................ 328/117

*Primary Examiner*—James W. Lawrence
*Assistant Examiner*—Harold A. Dixon
*Attorney, Agent, or Firm*—T. H. Whaley; C. G. Ries

[57] ABSTRACT

An illustrative embodiment of the invention includes method and apparatus for linearizing the gain of borehole gamma ray energy measurement apparatus. A known energy peak (or peaks) which is prominent in the gamma ray energy spectra of borehole measurements is monitored and any drift in its apparent location in the energy spectrum is used to generate an error voltage. The error voltage is applied in an inverse feedback manner to control the gain of system amplifiers to cancel the drift.

1 Claim, 2 Drawing Figures

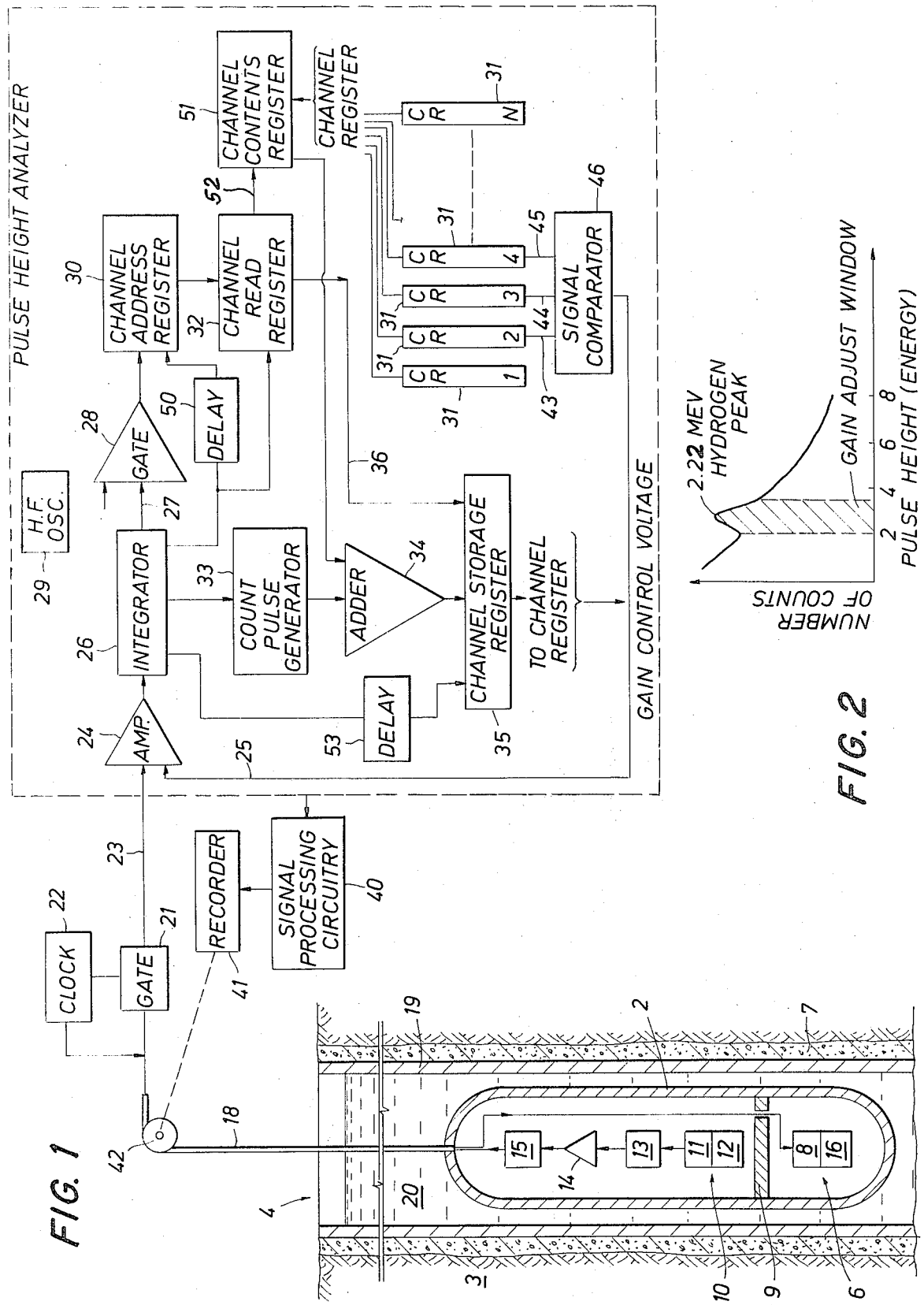

PULSED NEUTRON LOGGING SYSTEM WITH GAIN COMPENSATION

This application is a continuation-in-part of copending application Ser. No. 181,910, filed Sept. 20, 1971 which is now abandoned.

BACKGROUND OF THE INVENTION

This invention relates to radiological well logging methods and apparatus for investigating subsurface earth formations traversed by borehole and, more particularly, to gain control means for use in gamma ray energy spectra well logging systems.

It is well known that oil and gas are more likely to be found in commercially recoverable quantities in those earth formations which are relatively porous and permeable than in more highly consolidated formations. It is also well known that an oil or gas filled earth formation or strata may be located by irradiating the earth formations surrounding a borehole with neutrons and measuring the intensity of the resultant gamma radiations which are produced at various levels in the borehole. Various proposals for measuring either the thermal capture gamma ray spectra of such earth formations irradiated with neutrons or the inelastic scattering spectra of the earth formations so irradiated have been proposed in the prior art.

Typical well logging systems proposed in the prior art for measuring these types of gamma ray energy spectra have included neutron generating means and gamma ray detecting means suspended via a well logging cable in the borehole. Surface processing equipment is also usually provided for interpreting electrical pulses produced in response to the gamma rays by the detection means. Usually proportional detectors of the scintillation type have been proposed for measuring the quantity and energy of gamma rays occurring from the resultant neutron irradiation. Electrical pulses whose amplitude is representative of the energy of gamma rays passing through a detector crystal are sent to the surface via the well logging cable. The surface equipment processes these pulses in some manner usually in order to determine the numerical distribution of pulses as a function of their pulse height.

It is apparent that in a system of this sort in which both the pulse height and the number of pulses contains valuable information, that the linearity and repeatability of the system is very important in the accuracy of the resultant measurements. It has been proposed, for example, in a copending application Ser. No. 82,028 filed Oct. 19, 1970 now abandoned which is assigned to the assignee of the present invention, to utilize a compensating circuit which adjusts the gain of the amplification which takes place at the surface in response to a known amplitude signal generated in the downhole equipment in order to preserve the linearity of the system. This known amplitude signal in the above-mentioned copending application is provided by a downhole pulse generator designed to generate pulses of a desired height, or voltage level, for this purpose.

Gain compensating circuitry such as that disclosed in the above-mentioned copending application has proven to be very useful. The borehole temperature varies nonlinearly as a function of depth. Hence any temperature compensation techniques used in the downhole circuitry or the surface circuitry taken by themselves could be ineffective. Moreover, the effect of the temperature distribution on the cable is unpredictable and the attenuation therefrom can cause an apparent gain drift in the system. In the system described in the above copending application the downhole pulser signal is injected into the system at a point subsequent to the development of the pulse height information by the downhole photomultiplier tube and detector crystal, but before it enters the logging cable. Thus surface or cable generated nonlinearities may be compensated for. Nonlinearities may be introduced into the measurements by the photomultiplier tube itself, however, as opposed to the cable or the other electronics in the system. Also, the detector crystal may introduce nonlinearities into the measurement if its temperature should vary over an extensive range. Nonlinearities introduced from these sources would be uncorrectable.

Accordingly it is an object of the invention to provide a new and improved method and apparatus for controlling the gain of a gamma ray energy measurement type well logging system.

Another object of the present invention is to provide new and improved gain control apparatus which corrects for nonlinearities introduced by the downhole detector in a well tool used to obtain gamma ray energy measurements.

A still further object of the present invention is to provide improved well logging systems for obtaining the gamma ray energy distribution of subsurface earth formations in a manner more accurate than heretofore possible.

The above and other objects, features, and advantages are provided by the present invention which includes methods and apparatus for generating a gain control signal voltage for controlling the gain of signal processing and analyzing circuitry based on the known position of a particularly recognizable energy peak in the gamma ray energy spectra of the subsurface earth formations.

In the invention downhole neutron generator means is provided together with gamma ray detection means and amplification means for sending resulting electrical pulses to the surface over a well logging cable. At the surface the gamma ray pulses are introduced into a pulse height analyzer apparatus which includes novel gain control circuitry which is pre-set to observe a particular known energy peak or feature occuring in the gamma ray spectra of the subsurface earth formations. In a particular embodiment described in more detail herein the 2.22 MEV hydrogen gamma ray energy spectrum peak is used for this purpose. After an initial set up, the hydrogen peak is centered in an energy range which is monitored by the gain control circuitry. Any nonlinearity or drift in the gain of the system is compensated for by the gain control circuitry which develops an error signal proportional in magnitude and whose algebraic sign is proportional to the direction of the drift. This error or gain control voltage is applied in an inverse feedback manner to compensate and maintain linearity of the amplification of the system. In this manner the known energy hydrogen peak is kept in the energy window being monitored.

The foregoing and other objects, features and advantages of the invention will appear more fully hereinafter. The detailed description which follows together with the accompanying drawings illustrate an embodiment of the present invention. It is to be understood, however, that the drawings and descriptions herein are for illustrative purposes only and are not to be construed as defining the limits of the invention.

BRIEF DESCRIPTION OF THE DRAWINGS

FIG. 1 is an overall simplified block diagram illustrating the principles of the present invention in use in a well logging system.

FIG. 2 is a graphical diagram illustrating the relative position and amplitude in a gamma ray energy spectrum of the known 2.22 MEV hydrogen peak used for gain control purposes in the invention.

DESCRIPTION OF THE PREFERRED EMBODIMENT

Referring now to FIG. 1 there may be seen a simplified functional and partly pictorial representation of the basic features of the well logging system illustrative of the present invention. More particularly, the system may be seen to be composed of a subsurface probe or sonde (2) which is suspended at one end of a well logging cable (18) and which provides data in the form of electrical signals or pulses to surface instrumentation which is connected to the other or uper end of the cable (18).

Referring to the system in greater detail the sonde (2) is illustrated as being composed of a fluid tight elongated steel housing which is adapted to be passed longitudinally through a borehole (4) in the earth formations (3) and which contains a neutron source (6) and a radiation detector (10), which for present purposes is preferably a scintillation counter, comprised of a photomultiplier (11) and a scintillating crystal (12). A previously discussed, the neutron source (6) bombards adjacent sections of the earth formations (3) which high energy neutrons such as that produced by the well known deuterium-tritium reaction (14 MEV neutrons) as the sonde (2) is moved vertically upwards in the borehole (4) by the cable (18). The scintillation counter (10) functions to detect a representative number of gamma rays emanating from the earth formations (3) as a result of such neutron bombardment. A radiation shield (9) of suitable composition is preferably interposed between the scintillation counter (10) and the neutron source (6) to prevent direct irradiation of the counter (10) by the source (6).

High energy neutrons such as those produced by the neutron generator (6) easily penetrate the steel casing (19) and its surrounding cement layer (7) to enter the surrounding earth formations (3). Either prompt gamma rays resulting from inelastic scattering of the neutrons or the later arriving capture gamma rays generated by the elements comprising the surrounding earth formations may be detected by the passage of the resulting gamma radiation through the detector crystal (12) which may be thallium doped sodium or cesium iodide or the like. The light flashes resulting therefrom are converted to electrical pulses whose height or voltage level is proportional to the intensity of the light flashes by the photomultiplier tube (11). If desired, an energy discriminator (13) may be used to permit only pulses having a pulse height corresponding to gamma ray energies above a certain predetermined energy level to be passed to the amplifier (14) and the cable driving circuit (15) for transmission to the earth's surface over the cable (18).

It will, of course, be understood by those skilled in the art that a continuous type neutron source such as an encapsulated mixture of plutonium and beryllium may be used rather than an accelerator if desired. Similarly, a detector other than a scintillation type proportional detector may be used if desired. The bias level or energy discrimination level set on the discriminator (13) may be used if desired to appropriately screen out pulses corresponding to background gamma rays of energy lower than a predetermined level. Such background could be caused by neutron activation of the iodine in the crystal itself. This reduces the number of count pulses placed on the cable and hence reduces the bandwidth requirements on the cable (18).

In the above-mentioned copending application, a downhole pulser or oscillator generating signal pulses of a known amplitude introduces such pulses at the level of the discriminator (13) into the system. These known amplitude pulses then traverse the cable (18) to the surface circuitry. It will be noted however that all system components which come prior to the discriminator (13) in such a system can still generate nonlinearities due to environmental condition changes. In the present invention however it is proposed to use a known peak which occurs in the gamma ray energy spectrum and which has a sufficient amplitude to be discernable and usable in nearly every borehole of interest to be logged. Such a peak, for example, could be the 2.22 MEV hydrogen capture gamma ray peak caused by interaction of the neutrons with hydrogen nuclei in the borehole fluid itself and in the surrounding earth formations.

Usually the borehole (4) is filled with a well fluid (20) during the logging operation. The fluid usually comprises an oil, water or drilling mud. Either type of fluid will have a substantial hydrogen content and therefore will have a predominant 2.22 MEV hydrogen line peak in its gamma ray energy spectrum. As the energy of this peak is accurately known, it may be used as will be subsequently described to control the overall amplification gain factor of the system to maintain the linearity thereof.

The system of FIG. 1 is further illustrated by the signal processing circuitry at the surface. When pulses arrive at gate (21) at the surface if they have occurred at a proper time, as determined by timing pulses generated by the clock pulse generator (22), they are passed on to the pulse height analyzing apparatus for determination of their energy content. Pulses from the clock pulse generator (22) are also coupled to the logging cable (18) for control of the downhole neutron source via a pulsing circuit (8) which controls the accelerator portion (16) of the neutron generator. In this manner the neutron generator may be turned on and off on the basis of timing information provided by the clock pulse generator (22). Thus synchronization may be maintained between the surface signal processing circuitry and the downhole equipment. For example, the clock pulse generator (22) may supply a timing pulse indication to the downhole pulser (8) to turn on the accelerator (16) for a predetermined duration of time. Simultaneously the clock pulse generator (22) may generate a conditioning signal to the gate (21) to prevent counts occurring during the generation of the neutron pulse by the downhole neutron generator (6) from passing through the gate (21) to the surface data processing circuitry. In this manner, capture events would be the primary data source input to the pulse height analyzer and therefore the 2.22 MEV capture gamma ray would not have reduced resolution caused by interfering gamma rays, such as inelastic gamma rays. In any event the input signals on the line (23) to the pulse height analyzing circuitry comprise a series of pulses each of whose amplitude is indicative of the energy which the gamma ray causing it lost in the detector crystal. This, in turn, is related to the energy of the gamma ray.

Immediately upon entry into the pulse height analyzer the input signal on line (23) is amplified by a gain controlled amplifier (24). The amplifier (24) is a linear operational amplifier having a wide dynamic range and whose gain may be controlled and adjusted by a feedback voltage signal on a line (25). This feedback voltage signal may be derived in the manner to be discussed subsequently. The amplified signal is then coupled to an integrator (26) which functions to generate and temporarily store a voltage level proportional to the height of the input pulse. The integrator (26) immediately supplies on line (27) a conditioning pulse to a gate (28). The conditioning pulse permits the gate (28) to pass sharp spike-like voltage pulses suitable for digital counting from a high frequency oscillator (29). The high frequency oscillator (29) output voltage pulses pass through the gate (28) and are summed in a channel address register (30) for the entire time that the gate (28) remains open. The channel address register (30) comprises a binary counting register which keeps a running sum of all the counting pulses from the high frequency oscillator (29) which pass through the gate (28) when conditioned by the integrator circuit (26). The gate (28) remains open as long as the integrator (26) provides a voltage on line (27) which exceeds the conditioning level of the gate (28).

After initially generating a voltage level proportional to the input pulse height the integrator (26) voltage begins to discharge through a bleeder resistor (not shown). After a finite length of time (depending on the value of the bleeder) the voltage will fall below a predetermined threshold level. At this time the integrator ceases to provide a conditioning signal on line (27) to the gate (28) and thus the high frequency oscillator output counting pulses are cut off from being summed into the channel address register (30). Simultaneously with this occurrence the integrator circuit (26) provides a reset pulse to the channel address register (30) via delay line (50) and a read pulse to the channel read register (32). This read pulse causes the channel read register (32) to accept the contents of the channel address register (30) as input to itself just prior to the resetting of the channel address register (30) to zero by the reset pulse provided by the integrator circuit (26). The delay line (50) delays the reset pulse provided by the integrator (26) for a sufficient time to allow the reading operation by the channel read register (32) to occur before the channel address register (30) is reset to zero. This binary number, which now resides in the channel read register (32) may be thought of as the address of a particular energy channel (or energy range), and is indicative of the energy of the downhole produced gamma ray data pulse just processed. Such a number may be used to index a particular one of a plurality of channel registers (31) which are binary memory registers comprising the addressable memory of the pulse height analyzer. There are N such binary registers having addresses 1 to N comprising this memory array. These binary address registers (30) and (32) are n bits in length where $2^n = N$. Thus, for example, if there are a total of 1,024 channel registers in the pulse height analyzer each address containing register (30) (32) is 10 bits or binary digits in length since $2^{10} = 1,024$. Thus the channel registers (31) are directly addressable in an individual sense based on the contents of the channel read register (32). The channel read register (32) is used to examine the contents of the particular channel register (31) which the binary contents of the channel read register (32) indexes. Upon the appearance of a new read pulse from integrator (26) the contents of the indexed channel register (31) is read into a channel contents register (51). The individual channel registers (31) contain at any given instant in time the sum of the number of counts which have occurred in the energy range or channel indexed by or corresponding to their address as will be explained.

As just described, the channel contents register (51) when appropriately indexed by the channel read register (32) as indicated by lead line (52) summons the contents of the indexed channel register (31). A count pulse generator (33), which is conditioned by an output pulse from the integrator (26) which occurs when the gamma ray data pulse has decayed below the aforementioned threshold value, generates a count pulse of a predetermined amplitude and duration appropriate for adding into the contents of the channel contents register (51) by a binary adder (34). The contents of the channel contents register (51) are thus supplied to the binary adder (34), incremented by adding the count pulse supplied from count pulse generator (33), and the resultant sum is supplied to a channel storage register (35). Channel storage register (35) is also indexed by the channel address register (30) via line (36). Upon receipt of a delayed write pulse from integrator (26) via delay line (53) the resultant new sum is placed back into the same channel register (31) from which the previously unincremented sum was located. Delay line (53) functions to delay the write pulse from integrator (26) (which occurred when the voltage level on the integrator (26) fell below the aforementioned threshold value) until the intermediate steps just described have had time to occur.

In this manner whenever a new data pulse appears from downhole on the input line (23) its amplitude is measured by the integrator (26), gate circuit (28), oscillator (29), channel address register (30) and appears in digital form in channel read register (32). This information is used as an index address to add one count in adder (34) into the contents of the indexed channel register (31) corresponding to the energy range of the input gamma ray data pulse. Thus a running sum is kept in each channel register (31) of the number of counts occurring in its energy range for a predetermined time interval. This information may then be interpreted by display on analog or digital plotting means or may be processed further by other signal processing circuitry (40) as desired. The resultant data may then be recorded as a function of borehole depth by recorder (41) which is mechanically or electrically linked with the sheave wheel (42) and driven so that the record medium contained thereon is moved as a function of the borehole depth of the downhole sonde (2) as it moves through the borehole.

It will be appreciated by those skilled in the art that the above description of a pulse height analyzer describes the operational principles of only one type of pulse height analyzer which may be used. Other pulse height analyzers such as the Technical Measurements Corp., Model 262 which convert the analog pulse height information into a digital number in different manners may be used if desired and the invention is not limited to the use of the type just described.

Referring now to FIG. 2 a gamma ray energy spectrum resulting from the pulse height analysis of the pulses generated by the downhole tool of FIG. 1 is illustrated schematically. In this gamma ray energy spectrum it will be noted that a prominent peak occurs at 2.22 MEV. This peak could occur in the energy range, for example, corresponding to the three channel registers whose addresses are 2, 3 and 4 of FIG. 1, if desired. For illustrative purposes, let us assume that channel registers 2, 3 and 4 of the pulse height analyzer of FIG. 1 fall within the shaded region of the gamma ray spectrum marked "gain adjust window" in FIG. 2 with the peak (2.22 MEV) occurring in channel 3. The contents of channel register 2, 3 and 4 are input on lines (43), (44) and (45) to a signal comparator circuit (46). The signal comparator circuit (46) comprises three digital to analog converters which convert the digital contents of channel registers 2, 3, and 4 into analog voltage levels. The analog voltage levels corresponding to the contents of channel registers 2 and 4 are compared with that corresponding to channel 3 in signal comparator (46). A voltage signal is provided by comparator (46) on line (25) whose amplitude is proportional to the difference between the contents of channel register 3 (the peak) and the contents of either channel register 2 or channel register 4 whichever difference is larger. The algebraic sign of this voltage signal is indicative of whether the difference signal so generated results from the difference between channel register 3 and channel register 2 or between channel register 3 and channel register 4.

Since channel register 3 is chosen initially to coincide with the 2.22 MEV hydrogen peak on the gamma ray energy spectrum of FIG. 2, then if any gain drift occurs in the system the peak will tend to drift out of the range of channel register 3 and into the range of either channel register 2 or channel register 4 due to the resultant non-linear amplification of the pulses generated by the system. When this occurs the signal comparator circuit (46) will detect a change in the relative proportion of counts, for example in channel register 3 and in channel register 2, and will generate an error signal of appropriate sign and amplitude. This error signal is fed back via line (25) to the control input of amplifier (24) of the pulse height analyzer and will cause a change in the gain of the amplifier (24) to compensate for the drift.

In this manner the 2.22 MEV hydrogen peak will be kept centered in channel register 3 and thus the center energy of channel register 3 will be kept in correspondence with the reference energy level 2.22 MEV. This principle could be extended if desired by monitoring another energy peak or more than one energy peak in the gamma ray spectrum in a similar manner. Error signals generated by the monitoring of a plurality of such energy peaks in the gamma ray spectrum could then be combined by logic circuitry in an appropriate manner to determine how the feedback or control voltage should effect the gain and/or baseline of the input amplifier stages of the pulse height and analysis apparatus. The baseline, of course, is the energy level of the lowest energy channel of the system.

The above description may make changes and modifications of the disclosed principles apparent to those skilled in the art. Such changes as are obvious come under the broader aspects of the invention. It is therefore the aim in the appended claims to cover all such changes and modifications as may fall within the true spirit and scope of the invention.

We claim:

1. A method for controlling and linearizing the gain of a nuclear well logging system comprising the steps of:

measuring the energy spectrum of gamma rays produced by earth formation materials surrounding a well borehole with digital energy measurement equipment having sufficient resolution to discern at least one recognizable energy peak in said gamma ray energy spectrum, said peak being the 2.22 MEV hydrogen photopeak;

comparing the apparent location of said 2.22 MEV hydrogen peak in said spectrum with its known location and generating an error signal proportional to the difference between its known location and its apparent location; and controlling the gain of said energy measurement equipment in response to said error signal so as to minimize said error signal.

* * * * *